Jan. 30, 1934.　　　K. P. KEENEY ET AL　　　1,945,436
TREATMENT OF BREAD
Filed Dec. 3, 1931
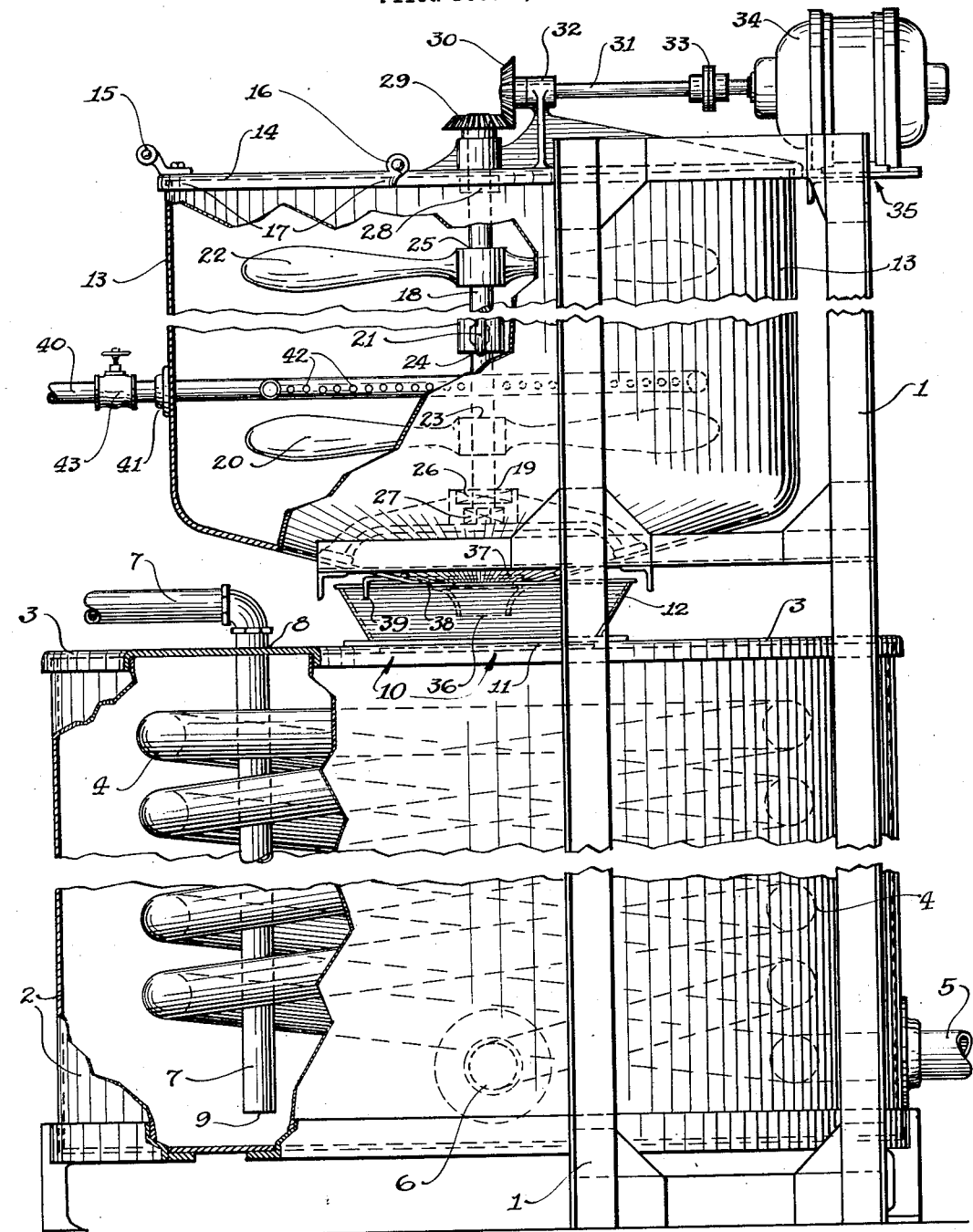
Karl P. Keeney and
Harold E. Tutley
INVENTORS
BY
ATTORNEY
WITNESS —

Patented Jan. 30, 1934

1,945,436

UNITED STATES PATENT OFFICE 1,945,436

TREATMENT OF BREAD

Karl P. Keeney, St. Louis, Mo., and Harold E. Turley, Chicago, Ill.

Application December 3, 1931. Serial No. 578,626

9 Claims. (Cl. 99—10)

This invention relates to methods of treating bread, for example, loaf bread, and to the products of such treatment.

One of the objects of this invention is to provide a method whereby baked bread may be broken down by digestion. Another object is to provide methods of treating such digested material. Another object is to provide a new and useful material for a bread mix. Another object is to provide new food products of high nutritional value, which may be readily digested and assimilated by the human organism. Other objects of the invention will appear from the descriptive matter and the claims which follow.

The accompanying drawing, which forms a part of this specification, illustrates a suitable device for breaking down or digesting bread in accordance with this invention. It will be understood, however, that the device shown in the drawing is merely illustrative and not shown by way of limitation.

Referring now to the drawing: A suitable frame 1 is provided. Receptacle 2 is provided with lid 3 containing brine coil 4 through which brine or other suitable refrigerating medium is circulated entering at 5 and leaving at 6. A pipe 7 leading from a pump, not shown, enters the receptacle 2 at 8 and terminates in the receptacle 2 at 9. Lid 3 is open at 10 to permit fluids to enter receptacle 2 after passing through strainer 11 of sieve 12. Digester tank 13 is rigidly held by frame 1 directly above receptacle 2. Digester tank 13 is provided with a lid 14 having a handle 15, a portion of the lid hinging at 16 to form a hatchway 17. Sshaft 18 is journaled at 19 and carries agitators 20, 21 and 22 which are rigidly affixed to shaft 18 at 23, 24 and 25 respectively. The lower end of shaft 18 passes through journal box 26 at 19 and is provided with bearing 27. Shaft 18 is journaled near the upper end at 28 and is provided at the top with bevel gear 29 which meshes with bevel gear 30 mounted on shaft 31, journaled at 32 and provided with a clutch 33 such that it may be driven by motor 34 which is suitably mounted on frame 1 at 35. Digester tank 13 is provided with an opening 36 which may be closed by plate 37 which may pass through the wall of digester tank 13 as at 38 and is provided with a handle member 39. Steam line 40 enters digester tank 13 through bushing 41 and is provided with a plurality of perforations as 42. Valve 43 may be provided to control the passage of steam into digester tank 13.

Due to the difficulty of estimating requirements, bakeries regularly produce an excess of bread which, heretofore, has been a by-product of little or no value because of the limited demand for stale bread.

Among other things, the present invention provides a method of treating this by-product which converts it into a valuable commodity.

We will describe one method of treating bread according to our invention.

Assuming that a lot of one hundred one-pound loaves are available for treatment, and referring again to the drawing, sixty gallons of water, which is acidfied by the addition of 120 c. c. concentrated hydrochloric acid is placed in digester tank 13 and 300 grams of powdered pepsin is thoroughly mixed in the acidified water. The 100 loaves of bread are then placed in the digester tank 13 and the shaft 18 revolved at a suitable speed to cause a thorough stirring of the mass by agitators 20, 21 and 22. The temperature of the mixture is raised to 149° Fahrenheit by the admission of steam through line 40, and kept at that temperature for 18 minutes during which time the mixture is being thoroughly agitated. At the end of 18 minutes' treatment at 149° Fahrenheit the cellular structure of the bread is broken down into small particles, thoroughly dispersed throughout the liquid. Sufficient steam is then admitted to raise the temperature of the digestate to 185° Fahrenheit. The liquid is then permitted to pass through sieve 12 into receptacle 2. Such of the crust as has not been broken down by the digestion process is restrained by sieve 12. The digestate is promptly cooled through the medium of a suitable refrigerant circulated through coil 4. The collected digestate may be used immediately or stored for subsequent use in the making of bread or other products as will be hereinafter more particularly described.

Assuming that it is desired to utilize the digestate in the making of bread, it should be borne in mind that the digestate contains all the essential elements of bread, some of which, however, have been predigested.

The usual bread formula in commercial operations is constructed upon a flour content of 100 pounds.

A typical bread formula is as follows:

| | |
|---|---|
| Flour | 100 pounds |
| Water | 60 pounds |
| Salt | 2 pounds |
| Sugar | 4 pounds |
| Milk | 4 pounds |
| Shortening | 2 pounds |
| Yeast | 2 pounds |
| Yeast food | 5 ounces |

Three gallons of digestate prepared from bread baked on the above formula would consist of 20 pounds of water and 5 pounds of bread, or a total weight of 25 pounds. A bakery having a normal overrun of five per cent could utilize the entire overrun in the regular dough mix by adding the digestate to the mix with the water in accordance with the following formula:

| | |
|---|---|
| Flour | 100 pounds |
| Water | 40 pounds |
| Digestate | 25 pounds |
| Yeast | 2 pounds |
| Yeast food | 4¼ ounces |
| Salt | 1 lb. 14 ozs. |
| Sugar | 3 lbs. 13 ozs. |
| Milk | 3 lbs. 13 ozs. |
| Shortening | 1 lb. 14 ozs. |

A comparison of the immediately preceding formula with the typical bread formula herein given shows that the use of the digestate permits the cutting down of other ingredients of the mix in proportion to the quantity of such ingredients present in the digestate.

It will be readily seen that the digestate in addition to other uses may be utilized in all types of yeast raised bakery products.

Assuming that bread used in making the digestate has been baked from an average recipe, the digestate, on analysis, would show approximately the following proportion of ingredients:

| | Per cent |
|---|---|
| Water | 83 |
| Gelatinized starch | 15 |
| Sugar | .7 |
| Salt | .34 |
| Shortening | .34 |
| Milk | .7 |

In using the digestate in the production of yeast raised bakery products, the formula must be adjusted to allow for the ingredients of the digestate.

Where it is desired to utilize the digestate for other purposes than incorporation into a dough mix, it is sometimes advantageous to carry the digestion process to a greater degree. This may be done, for example, by adding diastatic malt, trypsin and eripsin to the digestate to convert the wheat starch into sugar and more completely break down the wheat proteins. The resulting product is a new food product which may be utilized in the manufacture of what might be termed liquid bread for use in the feeding of invalids and infants. The product is palatable and nutritious and, because of its predigested condition is readily assimilated by the human digestive mechanism.

Yet another new product may be prepared by passing liquid digestate, whether or not it has been treated with diastatic malt, trypsin and eripsin, or the like, over hot rolls to form a flaked food product.

Other known evaporating apparatus, such as spray drying towers and the like may be utilized to reduce the digestate to a granular or powdered form as desired.

Evaporated digestate may be utilized in the manufacture of confections, breakfast foods, condensed soups, seasonings, sauces and the like.

We claim:

1. The method of treating bread which comprises subjecting the bread to the action of a digestant in the presence of acidified water, agitating until the non-crust material is broken down and mixed with the water, and thereafter removing the crust material.

2. The method of treating bread which comprises subjecting the bread to digestants in the presence of water, agitating until the non-crust material is broken down and mixed with the water, removing the crust material, and thereafter again subjecting to the action of digestants.

3. The method of treating bread which comprises subjecting the bread to the action of digestants in the presence of water, agitating until the non-crust material is broken down and mixed with the water, removing the crust material, thereafter again subjecting to the action of digestants, and removing the solids by evaporation of the water.

4. The method of making bread which comprises first preparing a digestate by subjecting baked bread to the action of a digestant in the presence of acidified water until the non-crust material is broken down and mixed with the water, removing the crust material and incorporating the resultant digestate in the dough mix.

5. The method of treating bread which comprises subjecting the bread to the action of digestants in the presence of water, agitated until the non-crust material is broken down and mixed with the water, removing the crust material, thereafter again subjecting to the action of digestants and then passing the resultant digestate over a hot roll to flake the solids.

6. The method of treating bread which comprises subjecting the bread to the action of digestants in the presence of water, agitating until the non-crust material is broken down and mixed with the water, removing the crust material, thereafter again subjecting to the action of digestants, and passing the resultant digestate through spray drying apparatus.

7. The method of treating bread which comprises subjecting the bread to the action of pepsin, in the presence of water slightly acidified by hydrochloric acid, agitating until the non-crust material is broken down and mixed with the water and removing the crust.

8. The method of treating bread which comprises subjecting the bread to the action of pepsin in the presence of water slightly acidified with hydrochloric acid, agitating until the non-crust material is broken down and mixed with the water, removing the crust material and thereafter subjecting the resultant digestate to the action of diastatic malt to convert the wheat starch into sugar, and the action of trypsin and eripsin to break down the wheat proteins.

9. The method of treating bread which comprises subjecting the bread to digestants in the presence of water, agitating until the non-crust material is broken down, and mixed with the water and thereafter removing the crust material.

KARL P. KEENEY.
HAROLD E. TURLEY.